Patented Jan. 6, 1953

2,624,715

UNITED STATES PATENT OFFICE 2,624,715

ADHESIVE

Myron F. Wildish, Terre Haute, Ind., assignor to Monsanto Chemical Company, St. Louis, Mo., a corporation of Delaware No Drawing. Application October 24, 1950, Serial No. 191,922

19 Claims. (Cl. 260—17.4)

This invention relates to the production of a new synthetic adhesive composition, particularly applicable to rewettable gummed tape, and to an improved rewettable gummed tape.

The term "rewettable gummed tape" is used to denote a paper or cloth sheet or strip, collectively referred to as "gumming stock," coated on one side with an adhesive capable of being readily rewet with water and which adhesive substantially immediately thereafter develops a sufficient tackiness to cause the tape to adhere to various surfaces to which it may be applied by the application of slight pressure. Obviously the same adhesive could be applied to envelopes, stamps, labels, wallpaper, etc. to be used in a similar manner. However, in the case of wallpaper it is generally preferable that the adhesive set up more slowly than in the other aforementioned applications since it is necessary to be able to slide the wallpaper in order to effect perfect register of the pattern.

For many years the principal gumming adhesive used in the industry has been a composition of approximately 40 to 60 per cent of a relatively high grade animal glue and 60 to 40 per cent of a carbohydrate, preferably a dextrin. These adhesives in general have been relatively satisfactory, but the source of raw material, being of natural origin, is subject to fluctuation both in regard to quality and quantity available. Animal glue is primarily a by-product of the meat packing industry, and therefore the quantity available for commercial use may at times be very limited causing considerable competitive bidding for the available supply by the varied animal glue using industries such as gummed paper and tape, paper and paper products, gasket and cork products, textiles, containers, abrasives, adhesives, matches, calcimine, printer rollers, woodworking, bookbinding, luggage, rug and carpet, etc. For example, recently it was necessary for various gummed tape manufacturers to either curtail operations or actually temporarily shut down due to lack of animal glue. The novel adhesive of this disclosure may be readily adapted for use in many of the above industries alleviating their dependence on animal glue.

Animal glue-dextrin tapes are further not entirely suitable unless stored under optimum conditions of temperature and humidity. It has been stated that the maximum adhesive value of these tapes begins to decrease after a period of three months and most manufacturers recommend that the tape be used within a six months period. Animal glue, being a protein, is also subject to micro-organism attack under various conditions which the rewettable gummed tape might encounter in normal field use with resultant inferior bonding of the affected tape. Animal glue-dextrin base rewettable gummed tape is also somewhat deficient in tolerance to rewetting with water. Too little water results in a starved glue line which possesses little or no resistance to shear stress. On the other hand, too much water results in flooding with resultant slip of the tape, if the bonded surfaces are under stress. Also the animal glue base tape must in general be applied within a period of 30 seconds from wetting in order to obtain a satisfactory bond. This requirement is ofen difficult to meet in shipping-room practice, especially when large containers are being sealed. There has thus long been a need for greater latitude of rewettable tapes to rewetting conditions and generally improved gumming adhesives.

The preferred requirements of a good rewettable gummed tape adhesive are that the adhesive must form a stable, easily rewettable, water tolerant, smooth, glossy, tasteless, odorless, flexible, non-toxic and non-hygroscopic film when spread on gumming stock and subsequently dried. The adhesive to be spread on the gumming stock preferably should: (1) be free from excessive shrinkage upon drying producing a relatively flat, easily handled sheet; (2) be relatively neutral in pH to avoid weakening and discoloration of the gumming stock and corrosion to processing equipment; (3) be relatively free from foaming; (4) possess a spreadable viscosity at relatively high total solids content (say 30 to 40 per cent) to permit rapid drying without excessive penetration into the gumming stock; (5) provide good adhesion at adhesive spreads below about 18 pounds per ream; (6) be relatively stable to heat; (7) possess adequate liquid storage life without material chemical, physical, or microbiological change; (8) possess specific adhesion to various surfaces; (9) develop a firm non-slipping bond rapidly when applied with slight pressure (see ASTM Bulletin No. 98, p. 23–27: May 1939 and TAPPI T463m–46) and (10) possess a satisfactory wet exposure latitude after rewetting and prior to application, while maintaining satisfactory ultimate adhesion (The Gummed Products Company permanent adhesion test).

It is an object of this invention to provide industry with an improved adhesive base which is not a by-product thus assuring a direct adequate supply at all times. Another object is to provide a rewettable gummed tape adhesive having relatively long shelf life and having substantially complete resistance to micro-organism attack. Another object is to provide a rewettable gummed tape of improved latitude when rewet prior to application. Another object is to produce a rewettable gummed tape adhesive base from a cross-linked solubilized heteropolymer containing a substantial number of reactive radicals from the group consisting of carboxyl

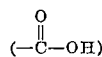

and anhydride

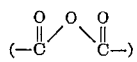

radicals, and a water soluble carbohydrate. It is a still further object of this invention to produce rewettable gummed tape adhesive compositions in which the adhesive comprises a water-dispersible derivative of a styrene-maleic anhydride type heteropolymer interpolymerized with from about 0.02 to about 1.0 (0.0155 mol for 1:1 styrene-maleic anhydride) and preferably from about 0.02 to about 0.2 per cent by weight, based on the heteropolymer, of divinyl benzene as a cross-linking agent, and a water-soluble carbohydrate. Further objects will be apparent to those skilled in the art from the following disclosure.

It has now been found that the styrene-maleic anhydride type heteropolymer cross-linked with from about 0.02 to about 1.0 (0.0155 mol) and preferably from about 0.02 to about 0.2 per cent by weight, based on the heteropolymer, of divinyl benzene and dispersed with the sum of from about 0.8 to about 2.25 and preferably from about 1.0 to about 2.0 mols of a solubilizer from the group consisting of alkali metal hydroxides, such as sodium hydroxide, potassium hydroxide, etc.; ammonium hydroxide; and monoamines having a dissociation constant greater than $10^{-6}$, for example ethylamine, secondary butylamine, dimethylamine, diethylamine, dipropylamine, diethylbenzylamine, etc.; all per mol of heteropolymer unit, and up to about 70 per cent, and preferably from about 25 to about 70 per cent, based on the formulation solids content, of a water-soluble carbohydrate from the group consisting of invert sugar, glucose, levulose, dextrin, sucrose, boiled starch, and starch, provides a very excellent adhesive. The above use of "sum" is understood to mean the sum of the mol-equivalents of the solubilizers, as for example 0.5 mol of each of the hydroxides of sodium, potassium, and ammonium, provides 1.5 mols of solubilizer. In general the use of substantially greater than one per cent divinyl benzene is to be avoided as the cross-linked heteropolymer formulation is not sufficiently soluble to be employed as an adhesive in this range.

It may readily be seen that the quantity of cross-linking agent must fall within relatively critical limits, but these limits will tend to vary for different agents and for different heteropolymers and even similar heteropolymers of varying molecular weight. This may be readily understood from the fact that long chain polymers require very little cross-linking agent to materially affect their flow properties, whereas short chain polymers in general require a higher proportion of cross-linking agent to cause a similar change in flow properties.

In general the use of amines has been avoided due to their potential toxicity. It must be borne in mind that the novel adhesive disclosed herein is especially suitable as a rewettable adhesive and whereas a large percentage of gummed tape is dispensed by machine the hazard of wetting by tongue is everpresent and proper precautions must be taken. This is even more important in envelope seals, stamps, stickers, etc. which may be used by the general public without an artificial wetting device.

The cross-linked heteropolymer may be solubilized and directly used as an adhesive base in limited applications, but such use is not recommended due to the resultant relatively inferior properties generally obtained. However, when the solubilized cross-linked heteropolymer is formulated with a water-soluble carbohydrate as hereinbefore disclosed the resultant adhesive base exhibits very useful and superior physical properties. This adhesive base is particularly suitable for rewettable gummed tape since it appears to store indefinitely, resists micro-organism attack, and exhibits excellent and unexpectedly high permanent adhesion. This base adhesive may be modified by such additives as humectants, plasticizers, fluidifiers, diluents, fillers, and defoamers, as for example urea, glycerine, pine oil, tributyl phosphate, waste sulfite, liquor or lignone sulfonate solids etc.

Suitable cross-linked heteropolymers containing a substantial number of reactive radicals from the group consisting of carboxyl

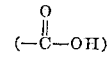

and anhydride

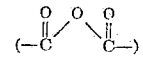

radicals may be defined as interpolymers of (A) polymerizable monovinyl compounds, (B) 4 to 6 carbon monoethylenic unsaturated dicarboxylic acids (as for example, maleic, fumaric, citraconic, mesaconic, and itaconic acids) and anhydrides, and (C) the cross-linking agent, preferably divinyl benzene, containing at least two polymerizable groups; as for example, styrene-maleic anhydrides, styrene-itaconic anhydride, vinyl acetate-maleic anhydride, styrene-vinyl acetate-maleic anhydride, etc. all interpolymerized in the presence of divinyl benzene. This class of heteropolymers is also sometimes referred to as cross-linked "styrene-maleic anhydride heteropolymer type" resins.

A substantial number of reactive radicals is understood to mean from one to two carboxyl radicals or one anhydride radical per heteropolymer unit.

The term "heteropolymer unit" is used to designate the smallest repeating structural unit of the heteropolymer, as for example the "heteropolymer unit" of styrene-maleic anhydride has a molecular weight of 202 and has the structure:

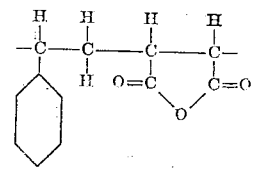

It will be specifically noted that the cross-linking agent is excluded in the above definition, since it is only present to the extent of from about 0.0003 to about 0.0155 mol per mol of heteropolymer unit.

Partial esters of the heteropolymers may be employed, as for example: methyl, ethyl, normal- and iso-propyl; normal-, iso-, secondary- and tertiary-butyl. The esterification may range from zero to substantially the half ester of the anhydride or dicarboxylic acid monomer. It appears that the butyl esters exhibit optimum rewettable adhesive properties. There is an increasing difficulty to rewetting as the ester group increases in size, thus the ester group should be limited to not more than four carbon atoms where the adhesive is intended for a rewettable application as in gummed tape, stamps, stickers, envelopes, etc. but may be larger where this property is not controlling or necessarily desirable.

Generally speaking the cross-linked styrene-maleic anhydride heteropolymer type resins are prepared by the well-known methods of the prior art (U. S. Patent No. 2,047,398, etc.), as for example, solvent, solvent-non-solvent, and mass polymerization processes, however the benzene solvent-non-solvent process currently appears preferable. The mol ratios of the heteropolymer monomers are preferably substantially one, thus for example the styrene-maleic anhydride heteropolymer is prepared by the interpolymerization of one mol of styrene with one mol of maleic anhydride in the presence of the cross-linking agent.

There are several reams used in the paper industry. The ream measurement used herein to calculate adhesive spread, weight of gumming stock and weight of test paper is 500 sheets of 24 inch by 36 inch paper. The adhesive spread is the pounds of dry adhesive, as determined by actual application conditions, coated on one ream of gumming stock. Since the applied adhesive may retain from about 5 to about 10 per cent moisture the actual dry weight of the adhesive should be employed in cost calculations wherein spread is used as the basis of comparison.

Samples of animal glue-dextrin rewettable gummed tape were obtained from various sections of the country, evaluated, and the best tape chosen to represent the "standard" commercial animal glue-dextrin tape in the comparison tests. Therefore, it should be kept in mind that even where the novel tape of this invention may be only equivalent to the "standard" commercial tape it is still actually better than the average commercial animal glue-dextrin tapes currently available.

Having briefly disclosed the novel cross-linked styrene-maleic anhydride heteropolymer type adhesive base the following examples are illustrative of the invention.

Example 1

Cross-linked styrene-maleic anhydride (SMA) heteropolymer wherein the cross-linking agent was 0.03 per cent by weight divinyl benzene was interpolymerized by the benzene solvent-non-solvent process. Two hundred eight grams of the above powdered product were dispersed in a water medium with 60.8 grams of sodium hydroxide. The pH of this dispersion was 8.3. Two hundred sixty-nine grams of dextrin were added to this dispersion to yield a formulation consisting of 50 per cent dextrin and 50 per cent of divinyl benzene cross-linked styrene-maleic anhydride sodium salt. It will be noted that the caustic added is sufficient to prepare the 1.5 mol sodium salt per mol of heteropolymer unit. The above formulation contained approximately 30 per cent total solids.

This adhesive base was spread onto kraft gumming stock by doctor bar application set at 0.005 inch and dried at 220° F. for 1.5 minutes yielding a tape containing 18.7 lbs. of adhesive per ream. Another spread was made with a doctor bar setting of 0.004 inch and dried for one minute at 220° F. yielding a tape containing 11.5 lbs. of adhesive per ream.

The gummed tapes were tested and found to be far superior or substantially equivalent to the standard tape, the permanent adhesion was particularly noteworthy in that an extremely good bond was still obtained after the standard tape had become useless. This indicates that the SMA base tape is particularly desirable where rewetting conditions may be somewhat unsatisfactory and in applications where there is a delay of over about 30 seconds between wetting and application of the tape. In general a large percentage of the failure of standard tape bonds is caused by inadequate wetting which disadvantage is materially reduced with the use of an SMA base tape in a similar application.

Example 2

A similar cross-linked styrene-maleic anhydride heteropolymer was prepared wherein 0.07 per cent by weight of divinyl benzene was used as the cross-linking agent. Two hundred grams of the above powdered material were dispersed with 58.5 grams of sodium hydroxide in a water medium. An aliquot containing 200 grams of total solids was removed and 200 grams of dextrin added thereto providing a 50:50 dispersion containing approximately 30 per cent total solids. This dispersion is approximately the 1.5 sodium salt of the divinyl benzene cross-linked styrene-maleic anhydride and has a pH of 8.36.

This adhesive formulation was spread onto kraft gumming stock at a doctor bar setting of 0.004 inch and dried for one minute at 220° F. yielding 10.7 lbs. of adhesive per ream. The gummed tape was tested and results similar to Example 1 were obtained.

The dry adhesive spread may vary over a considerable range, but from about 10 to 18 pounds per ream appears preferable. Also the drying conditions may be widely varied; time, temperature, relative humidity, etc. being correlated to produce a tape of substantially optimum equilibrium moisture conditions as is well-known in the art. Thus, for example commercial drying temperatures of about 500° F. may be employed for about 20 to 30 seconds to produce a gummed tape. In general it is preferable to effect rapid drying both to maintain a high production rate and produce a superior gummed tape.

The novel adhesive of this disclosure has good specific adhesion for various surfaces, for example, paper, wood, glass, metal, plaster, painted surfaces, etc. The adhesive may also be used to laminate paper, wood veneer, etc. where the product will not be subjected to adverse weather conditions. In general where such adverse applications are contemplated a high percentage of the solubilizer should be of a volatile nature in order to increase the ultimate water resistance.

While various specific examples of compositions and processes embodying the present invention have been described above, it will be apparent to those skilled in the art that many changes and modifications may be made in the methods of procedure, and that a wide variety of specific adhesive formulations may be employed. Therefore, it should be understood that the examples cited and the particular proportions and methods of procedure set forth are intended to be illustrative only, and are not intended to limit the scope of the invention.

I claim:

1. An adhesive composition comprising an adhesive base from the group consisting of cross-linked synthetic heteropolymers containing a substantial number of reactive radicals from the group consisting of

and

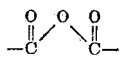

said heteropolymer being polymerized from a mixture consisting of (A) monomers of polymerizable monovinyl compounds, wherein the monovinyl group contains the sole polymerizable unsaturated group of the molecule, and the monomer is free from other reactive groups, (B) 4 to 6 carbon atom monoethylenic unsaturated dicarboxylic acids, selected from the group consisting of maleic acid, fumaric acid, citraconic acid, mesaconic acid and itaconic acid, anhydrides, and partial alkyl esters thereof, and (C) a cross-linking agent, wherein the cross-linking agent consists of from about 0.02 to about 1.0 per cent by weight of divinyl benzene, reacted with the sum of about 0.8 to about 2.25 mols of a solubilizer from the group consisting of alkali metal hydroxides, ammonium hydroxide and monoamines of greater dissociation constant than $10^{-6}$, all per mol of heteropolymer unit, wherein the heteropolymer unit contains substantially equimolar amounts of the monomers (A) and (B), and from about 25 to about 70 per cent, based on the formulation solids content, of a water-soluble carbohydrate from the group consisting of invert sugar, glucose, levulose, dextrin, sucrose, boiled starch, and starch.

2. A rewettable gummed tape comprising the adhesive of claim 1 coated onto gumming stock.

3. An adhesive composition comprising an adhesive base from the group consisting of cross-linked synthetic heteropolymers containing a substantial number of reactive radicals from the group consisting of

and

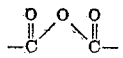

said heteropolymer being polymerized from a mixture consisting of (A) monomers of polymerizable monovinyl compounds, wherein the monovinyl group contains the sole polymerizable unsaturated group of the molecule, and the monomer is free from other reactive groups, (B) 4 to 6 carbon atom monoethylenic unsaturated dicarboxylic acids, selected from the group consisting of maleic acid, fumaric acid, citraconic acid, mesaconic acid and itaconic acid, anhydrides, and partial alkyl esters thereof, and (C) a cross-linking agent, wherein the cross-linking agent consists of from about 0.02 to about 0.2 per cent by weight of divinyl benzene, reacted with the sum of about 0.8 to about 2.25 mols of a solubilizer from the group consisting of alkali metal hydroxides, ammonium hydroxide and monoamines of greater dissociation constant than $10^{-6}$, all per mol of heteropolymer unit, wherein the heteropolymer unit contains substantially equimolar amounts of the monomers (A) and (B), and from about 25 to about 70 per cent, based on the formulation solids content, of a water-soluble carbohydrate from the group consisting of invert sugar, glucose, levulose, dextrin, sucrose, boiled starch, and starch.

4. A rewettable gummed tape comprising the adhesive of claim 3 coated onto gumming stock.

5. An adhesive composition comprising an adhesive base from the group consisting of cross-linked styrene-maleic anhydride, and partial alkyl esters thereof, wherein the cross-linking agent consists of from about 0.02 to about 1.0 per cent by weight of divinyl benzene, reacted with the sum of about 0.8 to about 2.25 mols of a solubilizer from the group consisting of alkali metal hydroxides, ammonium hydroxide and monoamines of greater dissociation constant than $10^{-6}$, all per mol of styrene-maleic anhydride heteropolymer unit, wherein the said heteropolymer unit contains substantially equimolar amounts of the monomers styrene and maleic anhydride, and from about 25 to about 70 per cent, based on the formulation solids content, of a water-soluble carbohydrate from the group consisting of invert sugar, glucose, levulose, dextrin, sucrose, boiled starch, and starch.

6. A rewettable gummed tape comprising the adhesive of claim 5 coated onto gumming stock.

7. An adhesive composition comprising an adhesive base from the group consisting of cross-linked styrene-maleic anhydride, and partial alkyl esters thereof, wherein the cross-linking agent consists of from about 0.02 to about 0.2 per cent by weight of divinyl benzene, reacted with the sum of about 0.8 to about 2.25 mols of a solubilizer from the group consisting of alkali metal hydroxides, ammonium hydroxide and monoamines of greater dissociation constant than $10^{-6}$, all per mol of styrene-maleic anhydride heteropolymer unit, wherein the said heteropolymer unit contains substantially equimolar amounts of the monomers styrene and maleic anhydride, and from about 25 to about 70 per cent, based on the formulation solids content, of a water-soluble carbohydrate from the group consisting of invert sugar, glucose, levulose, dextrin, sucrose, boiled starch, and starch.

8. A rewettable gummed tape comprising the adhesive of claim 7 coated onto gumming stock.

9. An adhesive composition comprising an adhesive base from the group consisting of cross-linked styrene-maleic anhydride, and partial alkyl esters thereof, wherein the cross-linking agent consists of from about 0.02 to about 0.2 per cent by weight of divinyl benzene, reacted with from about 1.0 to about 2.0 mols of sodium hydroxide, all per mol of styrene-maleic anhydride heteropolymer unit, wherein the said heteropolymer unit contains substantially equimolar amounts of the monomers styrene and maleic anhydride, and from about 25 to about 70 per cent, based on the formulation solids content, of a water-soluble carbohydrate from the group consisting of invert sugar, glucose, levulose, dextrin, sucrose, boiled starch, and starch.

10. The adhesive composition of claim 9 wherein the carbohydrate is invert sugar.

11. The adhesive composition of claim 9 wherein the carbohydrate is dextrin.

12. A rewettable gummed tape comprising the adhesive of claim 11 coated onto gumming stock.

13. An adhesive composition comprising the reaction product of cross-linked styrene-maleic anhydride, wherein the cross-linking agent consists of from about 0.02 to about 0.2 per cent by weight of divinyl benzene, with substantially 1.5 mols of sodium hydroxide, all per mol of styrene-maleic anhydride heteropolymer unit, wherein the said heteropolymer unit contains substantially equimolar amounts of the monomers styrene and maleic anhydride, and from about 25 to about 70 per cent, based on the formulation solids content, of a water-soluble carbohydrate from the group consisting of invert sugar, levulose, dextrin, sucrose, boiled starch, and starch.

14. The process which comprises coating gumming stock with a film of a rewettable adhesive composition comprising an adhesive base from the group consisting of cross-linked synthetic heteropolymers containing a substantial number of reactive radicals from the group consisting of

and

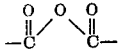

said heteropolymer being polymerized from a mixture consisting of (A) monomers of polymerizable monovinyl compounds, wherein the monovinyl group contains the sole polymerizable unsaturated group of the molecule, and the monomer is free from other reactive groups, (B) 4 to 6 carbon atom monoethylenic unsaturated dicarboxylic acids, selected from the group consisting of maleic acid, fumaric acid, citraconic acid, mesaconic acid and itaconic acid, anhydrides, and partial alkyl esters thereof, and (C) a cross-linking agent, wherein the cross-linking agent consists of from about 0.02 to about 1.0 per cent by weight of divinyl benzene, reacted with the sum of about 0.8 to about 2.25 mols of a solubilizer from the group consisting of alkali metal hydroxides, ammonium hydroxide and monoamines of greater dissociation constant than $10^{-6}$, all per mol of heteropolymer unit, wherein the heteropolymer unit contains substantially equimolar amounts of the monomers (A) and (B), and from about 25 to about 70 per cent, based on the formulation solids content, of a water-soluble carbohydrate from the group consisting of invert sugar, glucose, levulose, dextrin, sucrose, boiled starch, and starch, dispersed in water, and drying said film to substantially equilibrium moisture conditions.

15. The process which comprises coating gumming stock with a film of a rewettable adhesive composition comprising an adhesive base from the group consisting of cross-linked synthetic heteropolymers containing a substantial number of reactive radicals from the group consisting of

and

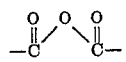

said heteropolymer being polymerized from a mixture consisting of (A) monomers of polymerizable monovinyl compounds, wherein the monovinyl group contains the sole polymerizable unsaturated group of the molecule, and the monomer is free from other reactive groups, (B) 4 to 6 carbon atom monoethylenic unsaturated dicarboxylic acids, selected from the group consisting of maleic acid, fumaric acid, citraconic aid, mesaconic acid and itaconic acid, anhydrides, and partial alkyl esters thereof, and (C) a cross-linking agent, wherein the cross-linking agent consists of from about 0.02 to about 0.2 per cent by weight of divinyl benzene, reacted with the sum of about 0.8 to about 2.25 mols of a solubilizer from the group consisting of alkali metal hydroxides, ammonium hydroxide and monoamines of greater dissociation constant than $10^{-6}$, all per mol of heteropolymer unit, wherein the heteropolymer unit contains substantially equimolar amounts of the monomers (A) and (B), and from about 25 to about 70 per cent, based on the formulation solids content, of a water-soluble carbohydrate from the group consisting of invert sugar, glucose, levulose, dextrin, sucrose, boiled starch, and starch, dispersed in water, and drying said film to substantially equilibrium moisture conditions.

16. The process which comprises coating gumming stock with a film of a rewettable adhesive composition comprising an adhesive base from the group consisting of cross-linked styrene-maleic anhydride, and partial alkyl esters thereof, wherein the cross-linking agent consists of from about 0.02 to about 1.0 per cent by weight of divinyl benzene, reacted with the sum of about 0.8 to about 2.25 mols of a solubilizer from the group consisting of alkali metal hydroxides, ammonium hydroxide and monoamines of greater dissociation constant than $10^{-6}$, all per mol of styrene-maleic anhydride heteropolymer unit, wherein the said heteropolymer unit contains substantially equimolar amounts of the monomers styrene and maleic anhydride, and from about 25 to about 70 per cent, based on the formulation solids content, of a water-soluble carbohydrate from the group consisting of invert sugar, glucose, levulose, dextrin, sucrose, boiled starch, and starch, dispersed in water, and drying said film to substantially equilibrium moisture conditions.

17. The process which comprises coating gumming stock with a film of a rewettable adhesive composition comprising an adhesive base from the group consisting of cross-linked styrene-maleic anhydride, and partial alkyl esters thereof, wherein the cross-linking agent consists of from about 0.02 to about 0.2 per cent by weight of divinyl benzene, reacted with the sum of about 0.8 to about 2.25 mols of a solubilizer from the group consisting of alkali metal hydroxides, ammonium, hydroxide, and monoamines of greater dissociation constant than $10^{-6}$, all per mol of styrene-maleic anhydride heteropolymer unit, wherein the said heteropolymer unit contains substantially equimolar amounts of the monomers styrene and maleic anhydride, and from about 25 to about 70 per cent, based on the formulation solids content, of a water-soluble carbohydrate from the group consisting of invert sugar, glucose, levulose, dextrin, sucrose, boiled starch, and starch, dispersed in water, and drying said film to substantially equilibrium moisture conditions.

18. The process which comprises coating gumming stock with a film of a rewettable adhesive composition comprising an adhesive base from the group consisting of cross-linked styrene-maleic anhydride, and partial alkyl esters thereof, wherein the cross-linking agent consists of from about 0.02 to about 0.2 per cent by weight of divinyl benzene reacted with from about 1.0 to about 2.0 mols of sodium hydroxide, all per mol of styrene-maleic anhydride heteropolymer unit, wherein the said heteropolymer unit contains substantially equimolar amounts of the monomers styrene and maleic anhydride, and from about 25 to about 70 per cent, based on the formulation solids content, of a water-soluble carbohydrate from the group consisting of invert sugar, glucose, levulose, dextrin, sucrose, boiled starch, and starch, dispersed in water, and drying said film to substantially equilibrium moisture conditions.

19. The process of claim 18 wherein the carbohydrate is dextrin.

MYRON F. WILDISH.

REFERENCES CITED

The following references are of record in the file of this patent:

UNITED STATES PATENTS

| Number | Name | Date |
| --- | --- | --- |
| 2,409,861 | Hunter | Oct. 22, 1946 |
| 2,471,818 | Hunter | May 31, 1949 |